May 30, 1967 G. J. O. WELIN-BERGER 3,322,044
MACHINE FOR MANUFACTURING COIN WRAPPERS
Filed Nov. 7, 1963 8 Sheets-Sheet 1

INVENTOR.
GUY JOHN OLOF WELIN-BERGER
BY
ATTY.

Fig.4

May 30, 1967  G. J. O. WELIN-BERGER  3,322,044
MACHINE FOR MANUFACTURING COIN WRAPPERS
Filed Nov. 7, 1963

Fig.6

May 30, 1967 G. J. O. WELIN-BERGER 3,322,044
MACHINE FOR MANUFACTURING COIN WRAPPERS
Filed Nov. 7, 1963 8 Sheets-Sheet 8

Fig.8

INVENTOR.
GUY JOHN OLOF WELIN-BERGER
BY
Irwin S. Thompson
ATTY.

United States Patent Office 3,322,044
Patented May 30, 1967

3,322,044
MACHINE FOR MANUFACTURING
COIN WRAPPERS
Guy John Olof Welin-Berger, Box 228, Nacka, Sweden
Filed Nov. 7, 1963, Ser. No. 322,216
Claims priority, application Sweden, Nov. 22, 1962,
12,553/62
9 Claims. (Cl. 93—39.1)

For transport to and custody in banks and similar establishments coins are usually packed in wrappers consisting of a jacket of paper and a bottom of similar material. This invention relates to a machine for manufacturing wrappers of this kind which in connection with this manufacture may also consist of plastic film or similar material. The object of the invention is to devise a machine which is able to operate automatically and to manufacture a great number of wrappers per unit of time.

The machine according to the invention comprises broadly a mandrel, means for feeding a jacket strip to the mandrel, means for bending the jacket strip around the mandrel to tubular form, means for supplying wrapper bottom parts to the end of the mandrel and for connecting the tubular jacket strip and the bottom part, and means for severing end portions from the tubular jacket strip to release the finished wrapper therefrom. The manufacture can be facilitated to a great extent, if the mandrel is provided with a duct which is alternately connected to a source of pressure and a source of suction, since in such case the mandrel may be used to retain the bottom part by suction at the end thereof while the bottom part is united with the jacket part and pneumatic pressure actuation may be utilized to eject the wrapper from the mandrel after severing it from the remainder of the tubular jacket strip. The feeding devices and valve members for controlling the pressure and suction can be readily devised for automatic operation. To render possible automatic operation the feed devices may comprise a member for controlling the feed movement such as to take place stepwise through distances corresponding to the length of the coin wrapper, said member being preferably a photocell reacting to marks put on the strip at intervals corresponding to the length of a wrapper.

The bottom parts may consist of discs and may be manufactured in a separate apparatus and fed to the assembly place by suitably devised means adapted for this purpose. Instead thereof the machine may comprise a punch for cutting the bottom parts out from a strip, said punch being movable to feed said strip to the assembly place for cutting out a bottom part.

The jacket and the bottom part may be assembled in a most simple manner by folding the mouth of the tubular jacket on the mandrel toward the bottom part when said part is retained at the end of the mandrel. For this folding operation the machine may be provided with a die which alternately with the punch is displaceable to and from the assembly place at the end of the mandrel.

The parts of the coin wrapper can be secured to each other in a simple manner if a heat-sensitive adhesive is applied before hand or in the machine to the jacket strip and/or bottom strip so that the bottom part and the edge of the jacket as well as the longitudinal edges of the jacket can be secured to each other merely by heating. The machine according to the invention also comprises automatically operating devices for this purpose.

Automatic application of the die for making the bottom joint and automatic actuation of the punch, if the machine is provided with such a punch, and automatic advance of the bottom strip is attained in a most simple manner by means of pneumatic cylinders provided with pistons which actuate said devices. The other or all of the movements may be obtained by means of cam-actuated drive means.

Additional features of the invention and advantages obtained thereby will appear from the following description of an embodiment illustrated in the annexed drawing.

Figures 1, 9:
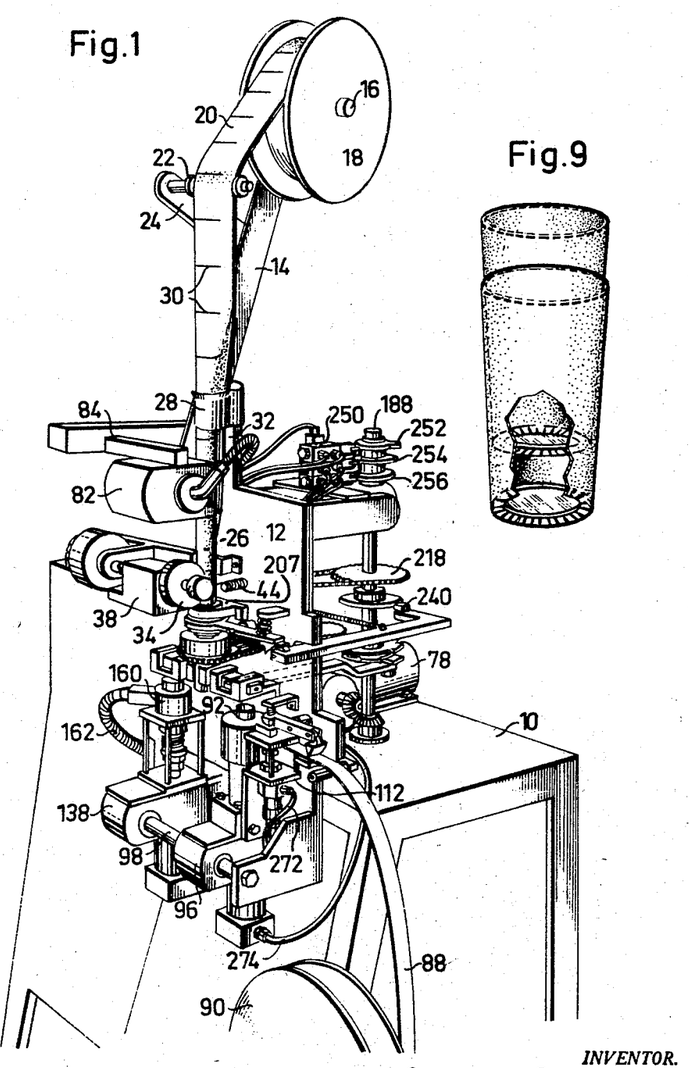
FIG. 1 is a perspective of the machine as viewed obliquely from the front and from one side, FIG. 2 a perspective on an enlarged scale of the main parts of the machine as viewed obliquely from the front and from the opposite side as compared with FIG. 1, FIG. 3 a perspective of the main parts of the machine as viewed obliquely from the rear and from one side, and FIG. 4 a perspective of part of the machine as viewed obliquely from the rear and from the opposite side as compared with FIG. 3.
FIG. 9 illustrates a pair of nested finished coin wrappers with part of the outer coin wrapper being cut away.
Figure 2:
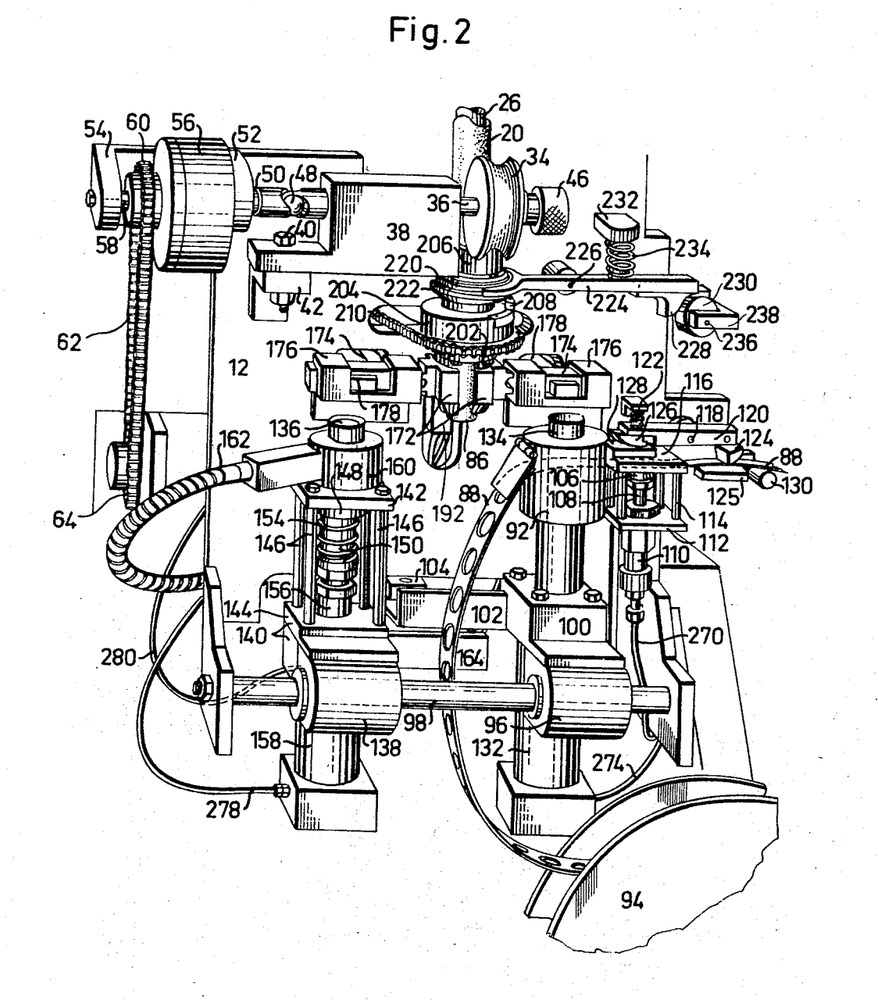
Figure 3:
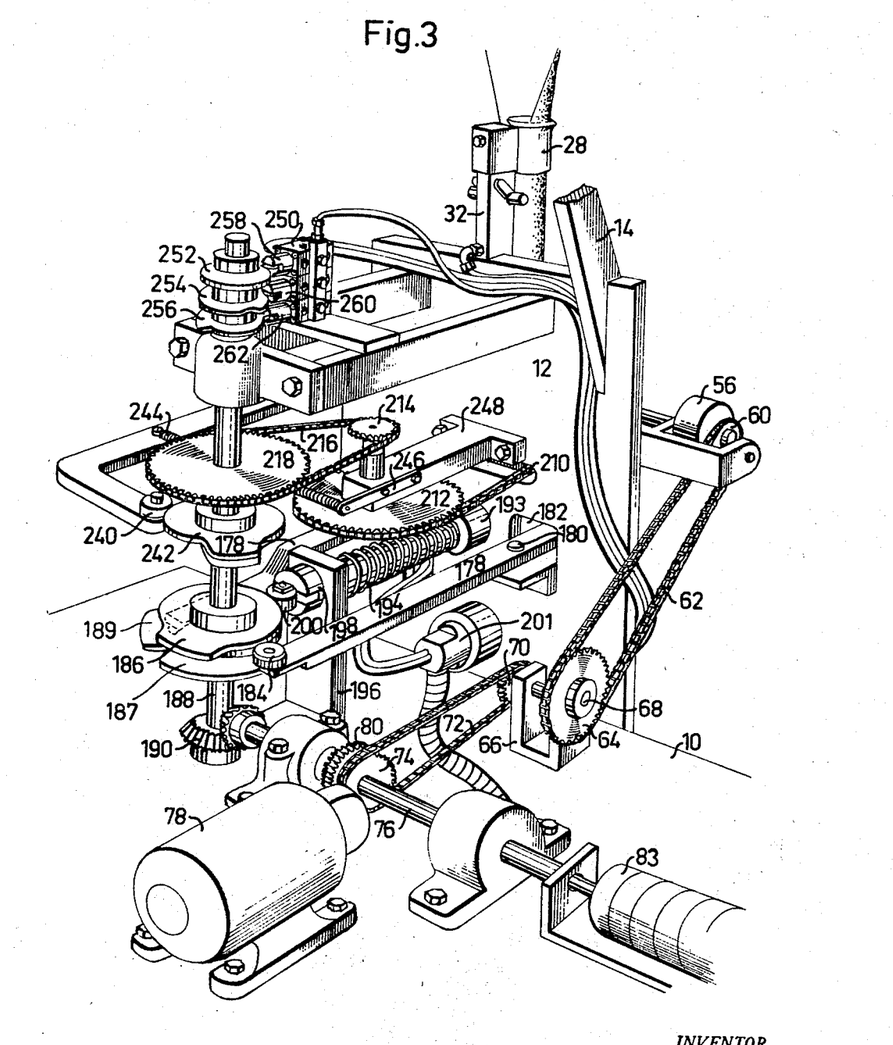

The frame of the machine illustrated in the drawing consists on the whole of a table 10 and a mounting plate 12 extending upwardly from the table. Secured to the mounting plate is an arm 14 having an axle 16 on which a strip reel 18 for a paper strip 20 is mounted. The strip extends over a guide member in the form of a roller 22 or rod which is secured to a bracket 24 projecting from the arm 14. The strip 20 passes down toward a mandrel 26 about which the strip is bent to tubular form by means of a guide plate 28. At equal intervals the strip has marks which are illustrated in the form of cross lines 30. The distance between these marks corresponds to the length of a coin wrapper. The mandrel 26 and the guide plate 28 are fixed to an upwardly extending part 32 at the upper edge of the mounting plate 12. The strip 20 is advanced by means of a feed roller 34 which urges the strip toward the side of the mandrel 26. The feed roller 34 is secured on a shaft 36 supported by a plummer block 38 which is swingable about a bolt 40 and supported by a bracket 42, the bolt 40 extending through the bracket 42 and the block 38. A tension spring 44 inserted between the end of the shaft 36 and the mounting plate 12 tends to turn the plummer block 38 about the bolt 40 such as to keep the feed roller 34 in engagement with the strip 20 on the mandrel 26. The outer end of the shaft 36 has a handle knob 46 which is connected to the feed roller 34 and by means of which the shaft 36 can be rotated or together with the feed roller 34 swung away from the strip 20. By means of a universal joint 48 the opposite end of the shaft 36 is connected to a drive shaft 50 which is supported by a plummer block 52 on the mounting plate 12. The shaft 50 is the output shaft of a magnetic clutch 56 the input shaft 58 of which is supported in a bearing 54 and provided with a sprocket wheel 60 of a chain transmission (FIGS. 3 and 2). In addition to said sprocket wheel the transmission comprises a chain 62, a sprocket wheel 64 on a shaft 68 supported by a plummer block 66, a sprocket wheel 70 for a chain 72 and a sprocket wheel 74 mounted on a shaft 76 which via transmission wheels 80 is driven by an electric motor 78 comprising a change gear. These chain transmission and change gears are shown by way of example only and may be replaced by other kinds of transmission. The magnetic clutch 56 is actuated by a photocell 82 (FIG. 1) which is supported by a bracket 84 on the arm 14. The photocell 82 responds to the marks 30 and disengages the magnetic clutch 56 as soon as a mark assumes a predetermined position relative thereto. On that occasion the output shaft 50 of the magnetic clutch as well as the shaft 36 and the feed roller 34 come to a standstill resulting in that the strip 20 is retained in a predetermined position. The magnetic clutch 56 is engaged by an electric contact of a timer 83 (FIG. 3) which is mounted on the shaft 76 and the general construction of which is apparent from the wiring diagram in FIG. 8. The described devices for advancing and stopping the strip 20 are constructed such that the end 86 (FIG. 2) of the lower part of the strip bent to tubular form around the mandrel projects somewhat below the lower end of the mandrel 26 each time the feed of the strip is interrupted. At that time the end 86 of the strip tube is located at an assembly place where a bottom part is to be introduced into the end of the strip tube and joined therewith by inward folding of the lower end of the strip tube. The bottom parts may be made from a strip 88 of comparatively rigid paper, plastic film or the like, said strip being unwound from a supply reel 90 and by means of feed devices moved through a punch 92 (FIGS. 1 and 2) from which the strip is wound onto a reel 94 after the bottom parts have been cut out. The punch 92 is movable such that it can convey the strip to the assembly place at the lower end 86 of the strip tube where the bottom part is to be cut out. To this end, the punch 92 has a bearing 96 which is supported by a guide bar 98 and can be displaced on the guide bar together with the punch from a right-hand end position as viewed in FIG. 2 to a position right below the lower end 86 of the jacket tube formed by the strip 20. The bearing 96 is connected to a block 100 which forms part of the punch system and has a laterally projecting arm 102 articulated to a cam actuated drive arm 104. If the cam-actuated drive arm 104 is swung to and fro the punch system will be displaced to and fro along the guide bar 98.

Figure 5:
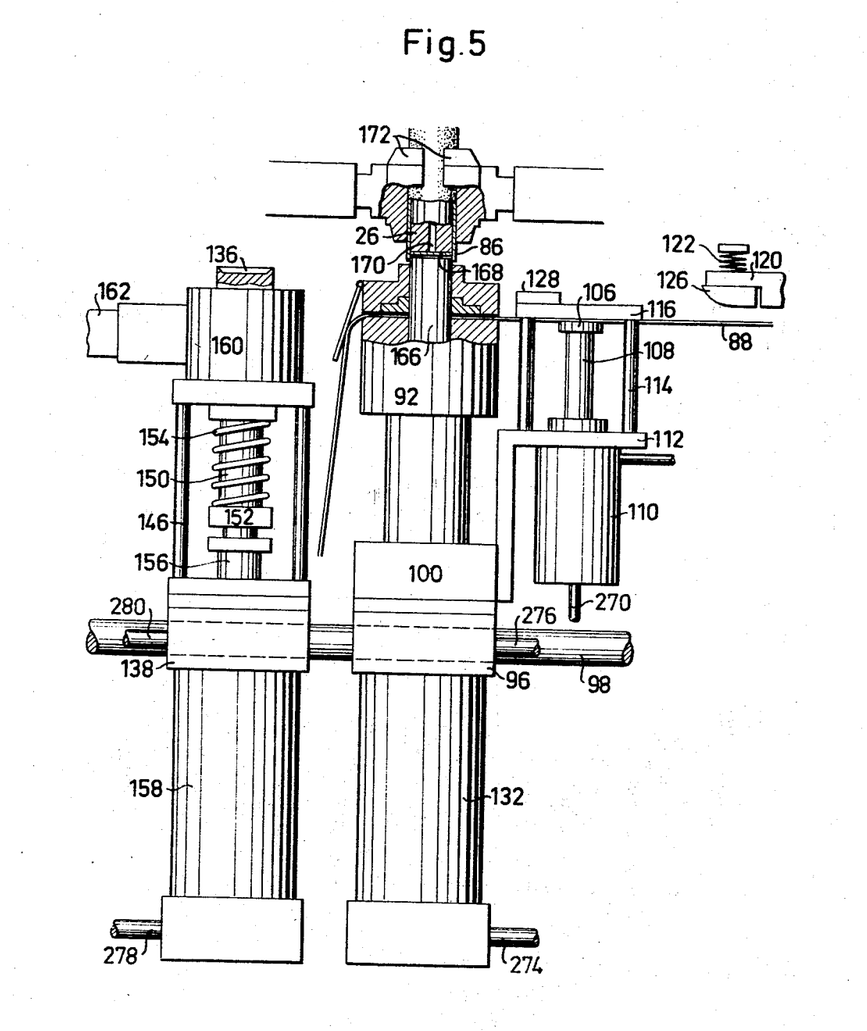
FIGS 5 and 6 are partially sectional elevations of details of the devices for connecting the bottom of the wrapper.
Figure 6:
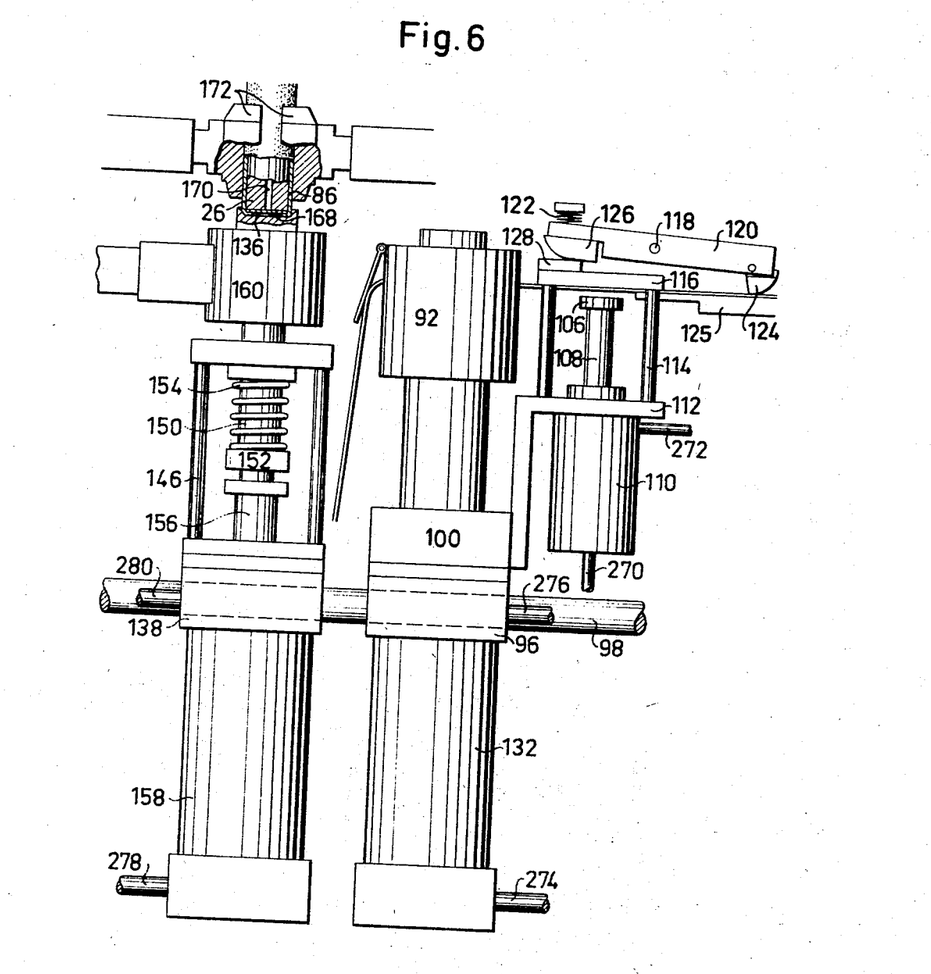

The devices for advancing the bottom strip 88 also comprise a strip retainer 106 actuated by a piston 108 in a pneumatic cylinder 110. The cylinder is carried by a plate 112 which by means of bolts 114 is secured to the underside of a support plate 116 along the underside of which the strip 88 is moved to the punch 92 and through a transverse passage in the punch. If the piston 108 is actuated by an upwardly directed pressure it forces the strip 88 toward the underside of the plate 116 so that the strip is retained in engagement with said plate (FIGS. 2, 5 and 6). Mounted on a horizontal shaft 118 on the front side of the mounting plate 12 is a double-armed lever 120 one end of which is biased downwards by a spring 122 and the other end of which has a retaining shoulder 124 adapted to engage the upper side of the strip 88 and to force the strip against an underlying support 125. At the spring actuated end the lever 120 has a sliding shoe 126 the rounded underside of which cooperates with a guide plate 128 on the upper side of the support plate 116. Before the strip 88 arrives under the lever 120 it passes over a roller or other guide member 130. The strip retainer 106 and its cylinder 110 as well as the plates 112 and 116 are secured to the punch 92 so as to follow the reciprocating movement thereof. If the strip retainer is under the action of an upwardly directed pressure and forces the strip 88 against the underside of the plate 116 the strip 88 is locked to the punch system and follows the movement thereof from the right-hand end position to the assembly place. Thereupon a bottom part is cut out from the strip by means of a punching tool 116 built in the punch 92, FIG. 5. The punching tool is actuated by the piston of a pneumatic cylinder 132 associated with the punch. The bottom part is forced up into a short tube 134 on the upper side of the punch. If the punch system is moved as described above along the guide bar 98 together with the plates 112 and 116 the guide plate 128 is pulled laterally away from the sliding shoe 126 on the double-armed lever 120. As a result the left-hand end of this lever as viewed in FIG. 2 is forced down by the spring 122 so that the shoulder 124 which previously has retained the strip 88 in engagement with the plate 125 is moved up out of engagement with the strip. After the punch system has been moved to the assembly place and has delivered a bottom part at this place it returns to the initial position shown in FIG. 2. At the end of this return movement the strip retainer 106 is moved down out of engagement with the strip immediately before the sliding shoe 126 starts to be actuated by the guide plate 128. If thereupon the sliding shoe 126 glides up onto the guide plate and the retaining shoulder 124 is moved down by the lever 120 against the strip 88 and holds the strip tight, the strip will be moved through a certain distance in the punch system 92 to a position suitable for the next succeeding punching operation.

Figure 4:
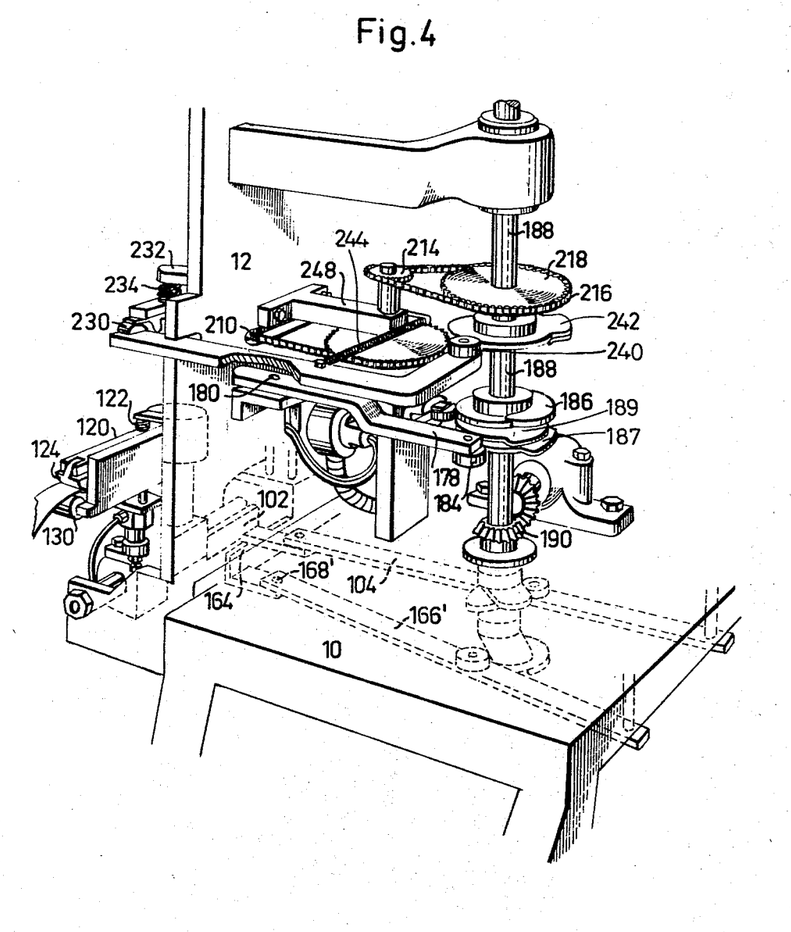

The guide bar 98 also carries a die 136 by means of a bearing 138 which is secured to a stand 140 forming part of the die system. The stand comprises an upper plate 142 which by means of bolts 146 is connected with a lower plate 144. The upper plate 142 has a guide bearing 148 for the lower part 150 of the die 136. Between the guide bearing 148 and a pair of nuts 152 on the lower part 150 of the die there is inserted a spring 154 which tends to move the die to a lower position into engagement with the upper end of a plunger 156 which projects upwardly out of a pneumatic cylinder 158. The die itself has a cup-shaped top surface and is partly surrounded by a heater 160, for instance an electric heater. Reference numeral 162 denotes a covering for electric wires to and from the heater. Secured to the stand of the die is an arm 164 which is articulated to a cam-actuated drive arm 166' (FIG. 4) pivotally mounted on a stud 168'. The cam-actuated drive arm is adapted to move the die system from the illustrated left-hand end position to a position in which the die 136 is right below the lower end 86 of the strip tube. If in this position air under pressure is suppled to the lower end of the die cylinder 158 the die 136 will be forced upward against the action of the spring 154 toward the sition air under pressure is supplied to the lower end inward toward a bottom part at the lower end of the mandrel 26. If instead thereof air under pressure is supplied to the upper end of the cylinder 158 and the lower part of the cylinder is relieved of pressure the plunger 156 will be moved downwards and the spring 154 can withdraw the die 136.

FIG. 5 illustrates to an enlarged scale the die system and the punch system in their positions relative to the mandrel 26 in which the punch system is right below the mandrel. In this position the punching tool 166 has cut out a bottom part 168 from the strip 88 while this strip is kept in position by the strip retainer 106, 108. The bottom part 168 has been drawn up within the lower end 86 of the jacket tube into close proximity of the underside of the mandrel by suction power acting in a duct 170 of the mandrel. At this moment the jacket part of the wrappers is kept in firm engagement with the cylindrical side of the mandrel by means of a pair of opposite jaws 172. The contact surfaces of the jaws fit the outside of the jacket of the wrapper. The jaws are mounted on shanks 174 which are longitudinally displaceable in bearings 176 on brackets fixed to the front side of the plate. Levers 178 are connected to the shanks 174 in a manner such that as the ends of the levers are swinging to and fro the jaws at the shanks will be displaced in the bearings 176 toward and away from the mandrel 26. The levers 178 are mounted on pivots 180 immediately behind openings 182 in the plate 12 through which the levers extend to the rear side of the plate (FIG. 3). At their ends the levers carry rollers 184 in engagement with cam discs 187 and 189 which are keyed onto a vertical shaft 188 driven by the drive shaft 76 via a bevel gear 190.

FIG. 6 illustrates the die system right below the mandrel in the position in which the die is moved upwards toward the end 86 of the jacket tube and in which the lower part of the end 86 has been forced in below the bottom part 168 and connected therewith by heat sealing. The jacket and/or bottom part is coated with a heat sensitive adhesive and the die 136 is heated by means of the electric heater 160 resulting in a firm connection between the jacket and the bottom part as the die is forced up against the bottom part.

The corresponding joint between the longitudinally extending edges of the jacket is obtained by means of a heated clamping member 192 which displaceably extends through the mounting plate 12 and in FIG. 2 is visible on the front side of this plate. The clamping member 192 is actuated by a spring 194 which is inserted between a bearing 193 (FIG. 3) and a support 196 on the table 10. The spring surrounds a spindle 198 provided with a cam follower 200 on the rear side of the support 196. The cam follower engages the cam disc 186 which once per revolution moves the cam follower together with the spindle and the clamping member 192 toward the mandrel 26 against the action of the spring 194, and thereby interconnects the longitudinal edges of the jacket by heat sealing. Reference numeral 201 denotes a connecting plug for an electric heater provided in the clamping member 192.

To finish the coin wrapper it is now only necessary to cut the jacket strip in correspondence to the distance between the cross marks 30 the intervals of which correspond to the length of the wrapper. For this operation a knife 202 is pivotally mounted on the underside of a rotatable holder ring 204 (FIG. 2), which is mounted on a sleeve 206 which concentrically surrounds the mandrel and is secured to the plate 12 by means of a clip 207 (FIG. 1). The knife 202 is secured to a shaft, not shown, which is provided with a lever having a projection 208 on the upper side of the holder ring 204. The holder ring 204 is driven by the vertical shaft 188 on the rear side of the plate 12 by means of a chain transmission 210, 212, 214, 216, 218 (FIGS. 2 and 3). A cam ring 220 axially displaceable on the sleeve 206 has a peripheral recess 222 engaged by one end of a fork 224 which is mounted on a fixed pivot 226 and the other end of which has a depending cam 228 in engagement with a cam follower 230.

Inserted between the last named end of the lever 224 and a projection 232 secured to the mounting plate 12 is a spring 234 which tends to move said end of the lever downwards and to keep the cam ring 220 in a lifted position. The cam follower 230 is rotatably mounted on a shaft 236 at the end of a lever 238 the other end of which is provided on the rear side of the plate 12, with a cam follower 240 in engagement with a cam disc 242 keyed onto the shaft 188. A spring 244 which is inserted between the lever 238 and an arm 246 of a bracket 248 mounted on the plate 12 keeps the cam follower 240 in engagement with the cam disc 242. During part of each revolution of the shaft 188 the cam disc 242 forces the follower 240 outwards resulting in that the front end of the lever 238 is swung inwards toward the cam 228. Consequently the lever 224 will be swung against the action of the spring 234 so as to displace the cam ring 220 downward on the sleeve 206. The underside of the cam ring 20 is conical and comes during the last named movement into engagement with the projection 208 which will be moved outwards resulting in that the knife 202 is swung inwards toward the jacket tube 20 and cuts of this tube. The gear ratio of the chain transmission 210–218 is such that the holder ring 204 has time to make a full revolution while the cam disc 242 forces the follower and the lever 238 carrying the follower outward.

In order to remove the cut wrapper from the mandrel 26, the die 136 has to be disengaged and laterally displaced, the clamping jaws 172 have to be moved from each other, and the heated sealing clamping member 192 on the rear side of the wrapper has to be withdrawn. The downward movement of the die is obtained by means of the pneumatic cylinder 158 and the other movements are obtained by means of the cams on the cam shaft 188. As soon as the wrapper is disengaged from said parts and is to be removed from the mandrel the source of suction which has been in communication with the duct 170 in the mandrel 26 is disconnected whereupon the duct instead is put into communication with a source of air under pressure. As a result the wrapper will be quickly discharged downwards from the mandrel under the action of the pressure acting on the inside of the bottom of the wrapper which can be collected in a suitable container. To facilitate the ejection of the wrapper the lower end of the mandrel 26 may be slightly conical and the wrapper will be correspondingly shaped. As will be seen from FIG. 9 this results in the advantage that the wrappers can be stacked in nested condition so as to take up smaller spaces.

In order to obtain the working motions of the punch 92 and die 136 as well as the application of the strip retainer 106 in properly timed order relative to the other motions of the various parts of the machine, a valve system 250 (FIG. 3) for controlling the cylinders 132, 158 and 110 is actuated by three cam discs 252, 254 and 256 which are keyed onto the cam shaft 188. The valve system 250 comprises three valve slides 258, 260 and 262 which control the inlets and outlets of the valve system 250. By means of a plurality of air lines the valve system communicates with a source of air under pressure and a source of suction and with the cylinders 132, 158 and 110 as will be seen from FIG. 7.

Figure 7:
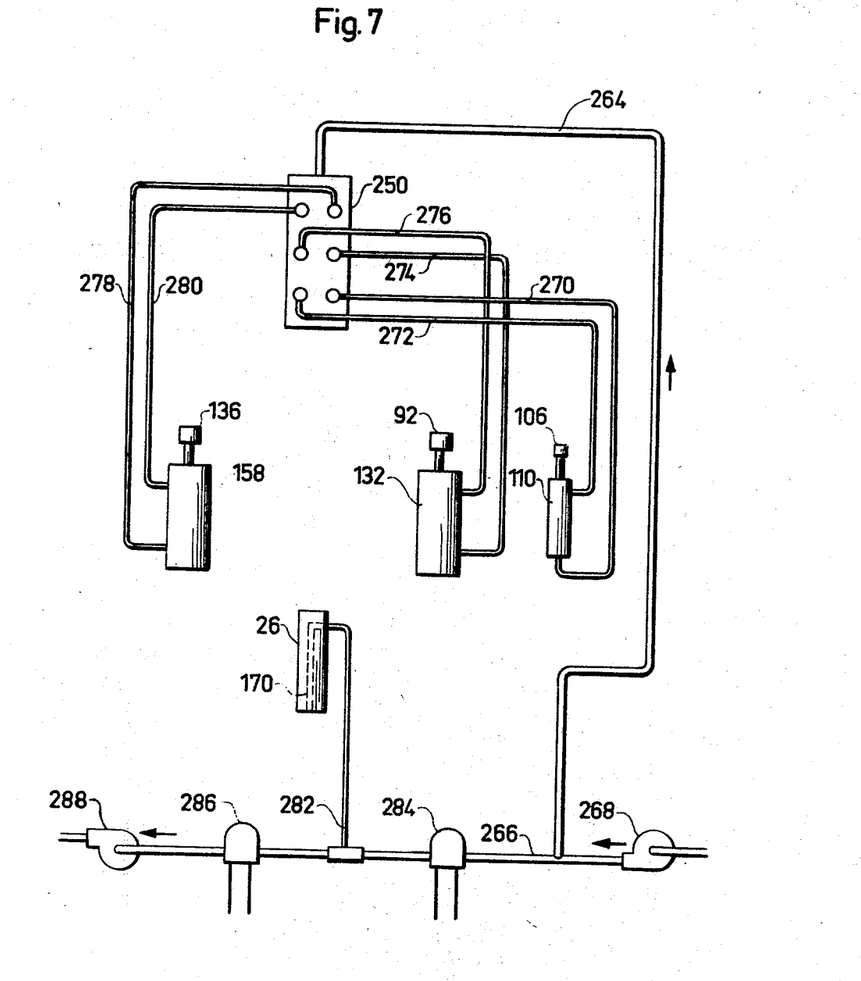
FIG. 7 is a diagram of the connections of air lines to valve devices and pneumatic cylinders.

Referring to FIG. 7 a line 264 is connected to the delivery line 266 of a compressor 268, the line 264 communicating with the inlet of the valve system 250. The valve system also communicates with three pairs of outlet lines. The lines 270 and 272 are connected to the lower and upper end, respectively, of the cylinder 110. The lines 274 and 276 are connected to the lower and upper end, respectively, of the cylinder 132. The lines 278 and 280 are connected to the lower and upper end, respectively, of the cylinder 158.

The delivery line 266 is also connected to a branch line 282 which communicates with the duct 170 in the mandrel 26. On either side of the place where the line 282 is connected to the line 266 magnetic valves 284 and 286 are provided in the delivery line 266. The magnetic valve 284 controls the connection between the source 268 of air under pressure and the duct 170, whereas the magnetic valve 286 controls the connection between a source of suction 288 and said duct 170.

Figure 8:
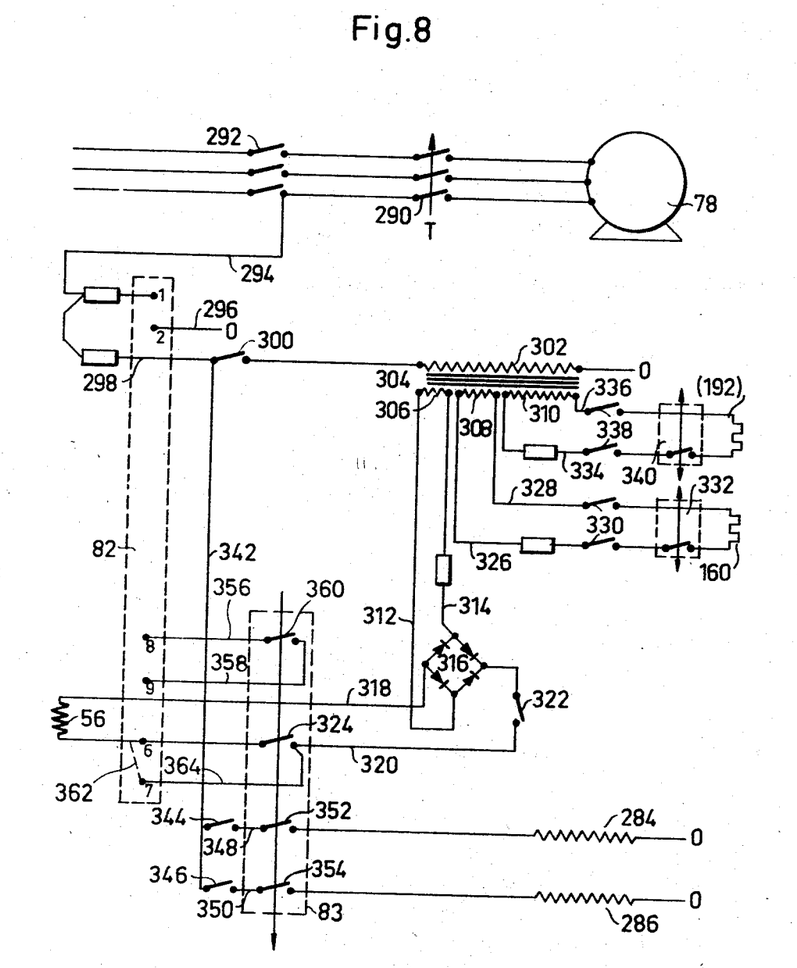
FIG. 8 is a wiring diagram of electric members comprised in the machine.

In the electric wiring diagram illustrated in FIG. 8 the drive motor 78 is a three-phase motor the feeder of which has a protective device 290 and a main circuit-breaker 292. From one of the phases a conducting wire 294 leads to one contact 1 of the contacts 1, 2, 8, 9, 6 and 7 of the timer 83, FIGS. 3 and 8, said contacts being connected in circuit with the photocell 82 and an associated amplifier. The contact 2 is connected to ground by means of a wire 296. The wire 294 is connected to a wire 298 having a switch 300. The wire 298 is connected to the primary winding 302 of a transformer 304 having three secondary windings 306, 308 and 310. From the secondary winding 306 current can be passed through wires 312 and 314 and via a double rectifier 316 and through wires 318 and 320 to the magnetic clutch 56 which as described above is adapted to engage the drive for the jacket tube and to be disengaged in response to the photocell 82. The wire 320 has a manual switch 322 and another switch 324 which is comprised in the timer 83. By means of wires 326 and 328 the secondary winding 308 of the transformer 304 is connected to the terminals of a heating coil of the electric heater 160 for heating the die 136. This circuit comprises manual switches 330 and a temperature control member 332. By means of wires 334 and 336 the secondary winding 310 is connected to a heater in the clamping member 192, FIG. 2, for heat-sealing of the longitudinal joint of the coin wrapper. This circuit, too, comprises manual switches 338 and a temperature control member 340. The control members 332 and 340 act to keep the temperature in the electric heaters at a suitable value. A branch wire 342 connected to the wire 298 can be connected by manual switches 344 and 346 to wires 348 and 350. The last named wires have contacts 352 and 354, respectively, in the timer 83 for engaging and disengaging the magnetic valves 284 and 286 which control the supply of air under pressure and negative pressure, respectively, to the duct 170 in the mandrel 26.

The terminals 8, 9 of the combined amplifier and photocell 82 are by means of wires 356 and 358 connected to a contact 360 in the timer 83. This contact serves to disengage the amplifier and thereby to make the photocell ineffective.

The terminals 6 and 7 of the combined amplifier and photocell are connected to a relay comprised in the amplifier and denoted by a dotted line 362 in FIG. 8. A wire 364 leads from the contact 324 of the timer to the terminal 7. Consequently, upon engagement of the manual switch 322 the magnetic clutch 56 can be engaged either by means of the contact 324 in the timer 83 or by means of the relay 362 of the amplifier and the wire 364.

In operation of the machine the shaft 76 of the timer driven by the motor 78 rotates continuously so that the contacts 324, 352, 354 and 360 are closed and opened in a predetermined timed order and during predetermined periods of time during each revolution of the shaft. Assuming the manual switch 322 to be engaged and the contact 324 in the timer to be closed the magnetic clutch 56 will receive rectified current from the wire 320. The input shaft 58 of the magnetic clutch 56 driven by the motor 78 via the transmission members 80, 74, 72, 70, 64, 62, 60 (FIGS. 3 and 2) imparts rotation to the output shaft 50 and consequently to the shaft 36 and the feed roller 34. As a result the strip 20 will be advanced by the feed roller. After the strip 20 has been advanced almost through a distance equal to the length of the jacket tube of the wrapper to be produced the timer 83 disengages its contact 324 with the result that the rectified current from the wire 320 can pass the magnetic clutch 56 via the relay 362 only. At the same time the contact 360 of the timer is closed so that current is supplied to the photocell and rectifier which are prepared for operation. Since the magnetic clutch 56 still receives current the feed of the strip 20 is continued, but is now controlled by the relay 362 and the photocell. Consequently if a mark 30 on the strip 20 comes to a position opposite the photocell and obscures the corresponding ray of light the relay 362 will be de-energized and the magnetic clutch becomes currentless and the feed of the strip is stopped. It will be apparent that the feed of the strip will be stopped very exactly. The feed is not started until the shaft of the timer has revolved to a position in which the contact 324 is closed again. Meanwhile the machine has performed all the motions required for attaching the bottom of the wrapper and for ejecting the finished coin wrapper from the machine.

What is claimed is:

1. A machine for manufacturing coin wrappers of sheet material, each wrapper consisting of a jacket and a bottom, comprising in combination a mandrel having a duct opening at an end of the mandrel, said end defining an assembly place, means for feeding a continuous jacket strip in its longitudinal direction to the mandrel parallel with the axis of the mandrel, means for bending the jacket strip about the mandrel to tubular form, means for supplying wrapper bottom parts to the assembly place at said end of the mandrel, valve means adapted to admit suction to said mandrel duct to temporarily retain the bottom part, means for securing the bottom part to the continuous tubular strip, means for severing a leading part of the tubular strip with its bottom part, and valve means adapted to admit pressure to said mandrel duct to remove the finished coin wrapper from the mandrel by pressure.

2. A machine for manufacturing coin wrappers of sheet material, each wrapper consisting of a jacket and a bottom, comprising in combination a mandrel having a duct opening at an end of the mandrel, said end defining an assembly place, means for longitudinally feeding to the mandrel a continuous jacket strip having marks spaced apart in correspondence to the length of the wrapper, means for bending the jacket strip about the mandrel to form a tube, means to unite the longitudinal edges of the bent strip, a photocell sensitive to the marks on the jacket strip, said feeding means being controlled by said photocell for feeding the jacket strip stepwise through distances corresponding to the length of the wrapper, means for supplying bottom parts to said assembly place at the end of the mandrel, means for connecting the bottom parts to the tubular jacket strip, means for severing an end portion of the tubular jacket strip with its bottom part from said strip, and air pressure means for ejecting the severed portion from the mandrel.

3. A machine as claimed in claim 2 and further characterized by the fact that said means for connecting the bottom parts to the tubular jacket strip comprises a die for folding the mouth of the tubular jacket toward the bottom part.

4. A machine for manufacturing coin wrappers of sheet material, each wrapper consisting of a jacket and a bottom, comprising in combination a mandrel, means for feeding a continuous jacket strip in its longitudinal direction along said mandrel, means for bending the jacket strip about said mandrel to tubular form while being fed, means for feeding a strip of bottom sheet material in the transverse direction of the jacket strip, a punch for cutting bottom parts from said strip of bottom sheet material, a die for folding an end portion of said tubular jacket strip toward a said bottom part, means to move said punch and said die alternately to a position in alignment with the mandrel at an end thereof to enable the punch to deliver a bottom part into the end of the tubular jacket strip and to enable the die to fold and press the rim of said end portion to the bottom part for connecting the jacket strip and the bottom part with one another, and means to sever a leading part of the tubular strip with its bottom part.

5. In a machine for manufacturing coin wrappers from a jacket tube and a bottom strip, a device for cutting bottom parts from said bottom strip and supplying them individually to the end of the jacket tube, comprising a punch, a reciprocating punching tool included in said tool for cutting bottom parts from said strip, means to reciprocate the punch transversely of the reciprocation of the punching tool between a position in alignment axially with the jacket tube and a lateral position, a strip retainer connected with the punch to enable feed of the strip as a result of the transverse reciprocation of the punch, a guide member mounted on said punch for reciprocation therewith, a stationary machine frame member, a spring actuated lever pivoted on said stationary machine frame member, said lever including a retaining means for temporary engagement with the strip and for locking it to the stationary frame member and further including means for engagement with said guide member to move said retaining means into retaining engagement with the strip during movement of the punch whereby to feed the strip relatively to the punch after a bottom part has been cut therefrom.

6. A machine for manufacturing coin wrappers of sheet material, each wrapper having a jacket and a bottom, comprising a mandrel having a duct opening at an end of the mandrel, said end defining an assembly place, means for feeding a continuous jacket strip in its longitudinal direction to said assembly place, means for forming from said continuous jacket strip a jacket tube around said mandrel, means for supplying bottom parts individually to an end of said jacket tube at said assembly place, a pneumatic piston and cylinder unit for operation of said bottom part supplying means, a die for folding the rim of said jacket tube toward the bottom part supplied to the end of the tube, means to sever a leading part of the jacket tube with its bottom part, a pneumatic piston and cylinder unit for reciprocation of said die, and a pneumatic system including a pressure supply conduit, a suction supply conduit, conduits for connecting said pressure supply and suction supply conduits with said mandrel duct and with the cylinders of said piston and cylinder units, and valve members adapted to supply pressure and suction to the duct of the mandrel and pressure to said cylinders in timed relation.

7. A machine as claimed in claim 6 and further characterized by the fact that two of said valves are electrically operated magnetic valves, one mounted in the conduits between the pressure supply and the duct of the mandrel and the other between the suction supply and said mandrel duct.

8. A machine as claimed in claim 2, in which said severing means comprises a knife, a holder ring for said knife surrounding the mandrel, said knife being pivoted to the holder ring, means for temporarily swinging said knife into the jacket tube on the mandrel, and means to rotate the holder ring so as to cause the knife to cut the jacket tube circumferentially.

9. A machine for manufacturing coin wrappers from sheet material, each wrapper having a jacket and a bottom, comprising a mandrel, means for feeding a continuous jacket strip in its longitudinal direction to said mandrel longitudinally of the latter, means for bending the jacket strip to tubular shape around the mandrel, a feed roller for feeding a jacket strip along said mandrel, said feeding means comprising a feed roller shaft, said continuously rotating drive shaft, a clutch for coupling said shafts together during controlled periods, a control member responsive to marks provided on said jacket strip, said clutch being controlled by said control member to cause feed of the jacket strip stepwise through distances corresponding to the length of the wrapper, means for supplying bottom parts to an end of said mandrel, means for uniting the bottom parts individually to an end of the tubular jacket strip, and means for severing an end portion of the tubular jacket strip with its bottom part from said strip in timed relation to the feed of the strip.

References Cited

UNITED STATES PATENTS

| | | | |
|---|---|---|---|
| 1,134,808 | 4/1915 | Beadle | 93—39.2 |
| 2,216,331 | 10/1940 | Swallow et al. | 93—39.3 |
| 2,623,443 | 12/1952 | Robinson | 93—80 |
| 2,644,999 | 7/1953 | Hill | 29—54 |
| 2,725,001 | 11/1955 | O'Neil | 93—55.1 X |
| 2,769,377 | 11/1956 | Jennings et al. | 93—29.1 X |
| 2,935,919 | 5/1960 | O'Neil | 93—82 |
| 3,049,979 | 8/1962 | Sayford | 93—39.3 |
| 3,229,595 | 1/1966 | Waycie | 93—39.1 |

BERNARD STICKNEY, *Primary Examiner.*